United States Patent Office 3,690,856
Patented Sept. 12, 1972

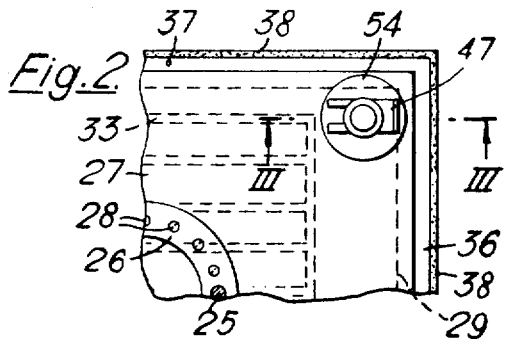
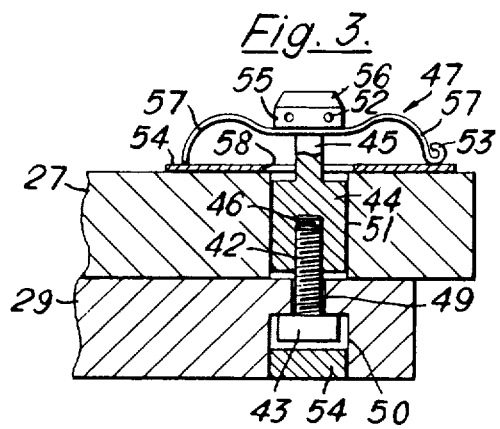
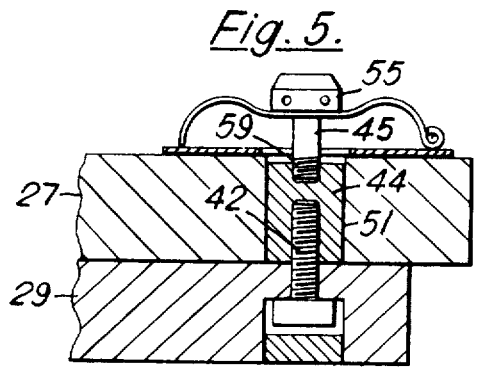

3,690,856
WELDED DOUBLE GLAZING UNITS
John Bryan, Saint Helens, England, assignor to Pilkington Brothers, Limited, Liverpool, England
Filed June 5, 1970, Ser. No. 43,881
Claims priority, application Great Britain, June 11, 1969, 29,679/69
Int. Cl. B66c 1/02; C03b 23/02
U.S. Cl. 65—287    10 Claims

ABSTRACT OF THE DISCLOSURE

Vacuum holding apparatus for engaging the upper surface of a sheet of glass in the manufacture of an all-glass welded double glazing unit, includes a chuck platen and a sheet-holding platen connected by at least two bolt connections, each bolt connection including spring means resiliently drawing the platens together.

BACKGROUND OF THE INVENTION (1) Field of the invention

The present invention relates to apparatus for manufacturing all-glass welded double glazing units.

(2) Description of the prior art

In one process for manufacturing all-glass welded double glazing units, two glass sheets are superimposed in close facial relation and united by a continuous peripheral weld by means of edge heating within a welding chamber. The central portions of the sheets are separated whilst the peripheral weld is plastic to form a gas space between said central portions. The lower sheet is usually held stationary on a lower vacuum platen and the upper sheet is engaged by an upper vacuum platen which is moved upwardly to lift the upper sheet relative to the stationary lower sheet.

There are limits to the sizes of units which can be made by a particular size of upper platen and in practice a particular size of upper platen is used only for a very small range of unit sizes. This raises difficulties when it is desired to use the same plant to make welded units over a range of sizes greater than can be obtained with a single top platen. Indeed, it is accepted that interchangeable upper platens are essential for the operation of a production line for making all-glass welded double glazing units of different sizes.

In known plant for the manufacture of all-glass double glazing units by the above process, interchangeable upper platens of different dimensions are supported from a chuck platen or backing member secured to lifting and lowering means. It has been proposed to rigidly connect an upper platen to the chuck platen by bolted connections.

An object of the invention is to provide an improved bolted connection between the chuck platen and the upper platen.

SUMMARY

According to the invention vacuum holding apparatus for engaging the upper surface of a sheet of glass in order to hold and lift the sheet in the course of manufacture of an all-glass welded double glazing unit, comprising a chuck platen attached to lifting means, and an interchangeable sheet-holding platen connected by two or more bolt connections to the chuck platen, the sheet-holding platen having a sheet-engaging surface and a recessed area or areas in said surface for connection to a vacuum source, and each bolt connection including spring means whereby the sheet-holding platen and the chuck platen are resiliently drawn together.

In one form of the invention each bolt connection comprises a body attached to the sheet holding platen and slideably inserted into an aperture in the chuck platen, the body having a neck portion supporting an upper cap portion above the upper surface of the chuck platen, and a spring disposed between the cap portion of said body and the chuck platen which spring causes the sheet-holding platen to be resiliently urged towards the chuck platen.

In another form of the invention each bolt connection comprises a body attached to the sheet-holding platen and slideably inserted into an aperture in the chuck platen, a headed bolt upstanding from said body, the head of the bolt being above the upper surface of the chuck platen, and a spring disposed between the head of said bolt and the chuck platen which spring causes the sheet-holding platen to be resiliently urged towards the chuck platen.

In each form of the invention the spring is preferably a leaf spring having a longitudinal slot for reception of said neck portion of said body or the shank of the bolt upstanding from said body.

BRIEF DESCRIPTION OF THE DRAWINGS

FIG. 2 is a section along the line II—II in FIG. 1;
FIG. 3 is a section along the line III—III in FIG. 2 illustrating the construction of one of the bolt connections;
FIG. 5 is a view similar to FIG. 3 of a modified construction of bolt connection.

DESCRIPTION OF THE PREFERRED EMBODIMENTS

Figure 1:
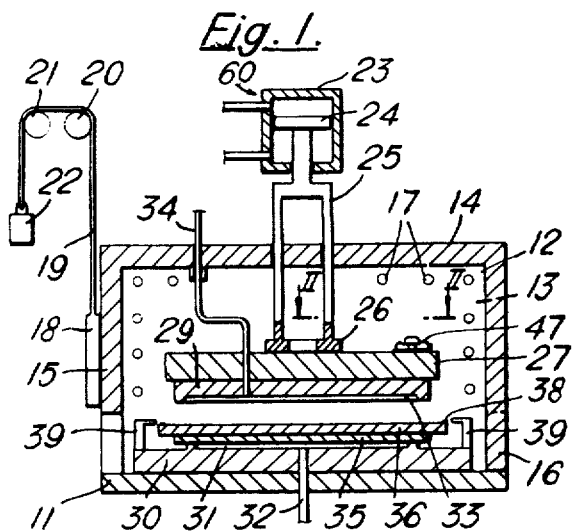
FIG. 1 is a diagrammatic vertical section through a welding chamber, by way of example, for the manufacture of all-glass double glazing units.

With reference to FIG. 1, there is shown a welding chamber for the manufacture of all-glass welded double glazing units. The welding chamber is defined by a floor 11, side walls 12 of which only the far wall is shown, roof 14 and end walls 15 and 16. End wall 15 extends downwardly from roof 14 but terminates short of floor 11 to leave an opening through which glass sheets can be inserted into the welding chamber and welded double glazed units removed from the welding chamber. The opening can be closed during welding by a door 18 suspended from a cable 19 which passes over pulley wheels 20, 21 and is connected at one end to the door 18 and at the other end to a counterweight 22.

Electrical heating elements 17 are disposed within the welding chamber adjacent to the upper regions of the side walls 15, 16 and beneath the roof 14.

Above the welding chamber there is mounted a double acting hydraulic jack 60 comprising a cylinder 23 and a piston 24. The piston 24 supports a yoke 25, of which the arms pass down through openings in the roof 14 and support a ring 26 to which a chuck platen 27 is secured by screws 28 (see FIG. 2). A sheet-holding platen 29 is supported beneath the chuck platen 27 in a manner which is described in detail below.

A second sheet-holding platen 30 is secured to the floor 11 of the chamber and has recesses 31 in its top surface connectable with a vacuum source by way of a duct 32. Similarly, the upper platen 29 has recesses 33 in its lower surface connectable with a vacuum source by way of a flexible conduit 34 which passes through a hole in the roof 14 of the welding chamber. If deired, each platen 29, 30 may have only one recess 33.

In operation, two glass sheets 35, 36 which have been washed, dried and preheated to a temperature of 480° C., are introduced into the welding chamber through the opening beneath the end wall 15, the upper platen 29 being in its raised position, as shown in FIG. 1. The sheet 35 rests on the lower platen 30 and the upper sheet 36, which has a length and width slightly greater than the length and width of the lower sheet 35, rests on sheet 35 and overlaps the sheet 35 equally on all four sides. The lower sheet 35 has a hole 37 (see FIG. 2) drilled therethrough and sheet 36 has a stripe 38 (see FIG. 2) of an electrical conductive material, e.g. a colloidal graphite, painted on the peripheral marginal regions of its top surface.

When the sheets 35, 36 are correctly located within the welding chamber, an electrode 39 is located adjacent each corner of the upper sheet 36 and the duct 32 is connected to its low pressure vacuum supply so that the recesses 31 in the upper surface of the lower platen 30 are evacuated whereby the lower sheet 35 becomes firmly held against the lower platen 30. The hydraulic jack 60 above the welding chamber is then operated to cause the upper platen 29 to be lowered until it rests on the upper sheet 36. Low pressure vacuum source is then connected to the conduit 34 so that the recesses 33 in the lower surface of the upper platen are evacuated whereby the upper sheet 36 is firmly held against the upper platen 29.

Electrical heating currents are passed through the electrically conductive stripe 38 on the top sheet 36 by means of the electrodes 39 to heat the edge region of the glass sheet 36. As the glass temperature rises, the stripe 38 burns off, but at this stage the heated glass at the periphery of the upper sheet 36 is hot enough to have become conductive and thus the electrical heating currents still pass through the edge regions of the sheets to cause said regions of the upper sheet to melt and unite with the edge regions of the lower sheet. A continuous peripheral weld is thus produced between the sheets 35, 36.

The hydraulic jack is then operated to cause the piston 24 to elevate the upper platen 29 and thus to separate the unwelded portions of the sheets 35, 36. As the upper platen 29 lifts the unwelded portions of the upper sheet 36 away from the unwelded portions of the lower sheet 35, air flows through the hole 37 in the lower sheet 35 into the space between the sheets to prevent the creation of a low pressure in the space resisting separation of the sheets.

When the unwelded portions of the sheets 35, 36 have been separated sufficiently to establish the desired space therebetween, the lifting of the upper platen is terminated, and the platens 30, 29 retain support of the sheets 35, 36 until the peripheral weld has cooled and thus hardened sufficiently to maintain the configuration of the unit which has been produced. The vacuum sources to the ducts 32, 34 are then disconnected to release the unit and the jack 60 is operated to raise the upper platen 29 clear of the welded unit. The door 18 may then be opened and the welded unit lifted out of the welding chamber. The cycle of operation may then be repeated by introducing a further pair of glass sheets 35, 36 into the welding chamber.

The means which are provided for connecting the upper platen 29 to the chuck platen 27 will now be described.

These means comprise two spring-loaded bolt connections located adjacent diametrically opposite corners of the platens 27, 29. With reference to FIG. 3, each bolt connection comprises a bolt 42 having a square head 43, the bolt projecting upwardly from a hole 49 passing through the upper platen 29 and the head 43 entering into a rectangular countersunk region 50 of the bore 49. Rotation of the bolt 42 is thus prevented and the head 43 of the bolt is disposed within platen 29 above the lower surface of said platen 29. The countersunk region 50 of the bore 49 is closed by a plug 54 so that platen 29 has a continuous and uninterrupted undersurface. The upwardly projecting portion of the bolt 42 is in screw thread engagement with a tapped bore 46 in one end of a cylindrical body 44 which is slideably inserted within a bore 51 in the chuck platen 27. The bore 51 is of constant cross-section and is open at both ends. The body 44 has a portion of reduced diameter integral therewith and constituting a neck 45 which projects upwardly from the chuck platen 27 and supports an integral cap 55. Tommy-bar holes 52 are provided in the cap 55 and the upper surface of the cap is chamfered at 56. The construction so far described thus allows the chuck platen 27 to be raised or lowered relatively to the upper platen 29, the chamfered upper surfaces 56 of the caps 55 assisting location of each cylindrical body 44 into its respective bore 51 in the chuck platen when the chuck platen is lowered into engagement with the upper platen 29.

Figure 4:
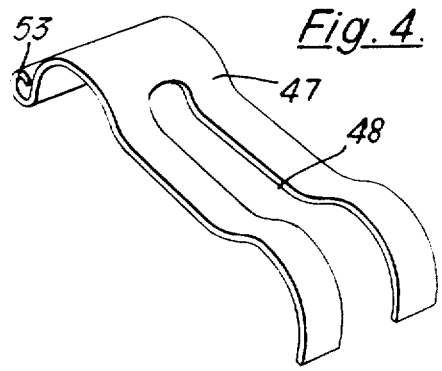
FIG. 4 is a perspective view of the leaf spring of the bolt connection shown in FIG. 3.

In order to retain the two platens in engagement, there is provided for each bolt connection a leaf spring 47 which has a slot 48 (see FIG. 4) extending longitudinally of the spring and which is open at one end, and downwardly turned ends 57. The width of the slot 48 is slightly greater than the diameter of the neck 45. The spring 47 may thus be slotted into position beneath the cap 55 and thereby prevents separation of the platens 27, 29. An annular plate 54 is provided on the upper surface of the chuck platen to prevent the downwardly turned ends 57 of the leaf spring from causing wear to the chuck platen. Preferably the tension of the leaf spring is such that when it is inserted beneath the cap 55 of the body 44, the upper platen 29 is urged into engagement with the chuck platen 27. It will be appreciated that the annular protective plate 54 has a bore 58 having a diameter which is greater than the diameter of the cap 55 so that it does not preclude upward movement of the chuck platen when the spring 47 is removed.

To assemble an upper platen 29 with a chuck platen 27, the bolts 42 are passed upwardly through the bores 49 in the upper platen and screwed into the bodies 44 which will then be upstanding from the upper surface of the platen 29 adjacent diametrically opposite corners of the platen 29. The platen 29, with the bolts 42 and the bodies 44, is then preheated to a temperature at or near the platen operational temperature.

The platen 29 is entered into the welding chamber through the opening beneath the end wall 15 and located beneath the chuck platen 27. The chuck platen 27 is lowered so that the bodies 44 slide into their respective bores 51 in the chuck platen 27 until the chuck platen 27 rests on the upper platen 29. The springs 47 are then forced beneath their respective caps 55 of the bodies 44, the neck 45 of each body 44 passing into and along the slot 48 of the associated spring 47, until the neck 45 is midway along the spring 47. In this example, the midlength portion of each spring 47 is slightly bowed downwardly so that the possibility of accidental longitudinal displacement of the spring 47 is minimised.

If necessary, a tommy-bar may be inserted into the holes 52 provided in each cap 55, and the cap, and hence the body 44, rotated further or less onto the bolt 42 to alter the tension in the spring 47. With both bolt connections tensioned sufficiently to maintain the desired contact between the platens 27, 29 during all normal operations of the welding cycle, the upper platen 29 is assembled ready for operation.

To remove the upper platen 29 from the chuck platen 27, e.g. in order to fix to the chuck platen another upper platen 29 of a different size, it is only necessary to lower the upper platen 29 onto the lower platen 30 and extract the springs 47 longitudinally from beneath the caps 55. The chuck platen 27 may then be raised, leaving platen 29 resting on platen 30, until platen 30 is clear of the bodies 44 of the bolt connections, the released upper platen 29 is then free for removal from the welding chamber. To assist in the insertion and removal of the springs 47, the end of each spring which is remote from the open end of the slot 48, is turned over as shown at 53 to permit a rod to be entered therein.

FIG. 5 shows a modified construction of bolt connection and the same reference numerals have been used where appropriate. In this modified construction, the neck 45 and cap 55 of the body 44 is of separate construction from the portion of the body which engages the bore 51 in the chuck platen 27, but nevertheless is fixed thereto by the provision of a tapped bore 59 in the upper surface of the main portion of the body 44 into which the neck 45 is screwed. In this case, body 44 is screwed down onto platen 29 and additional or lessening of the tension of the spring 47 is obtained by rotating the cap 55, and hence the neck 45, relative to the main portion of the body 44.

Both types of bolt connector described above are of simple construction and due to their self-tensioning ability effectively retain the platens 27, 29 in contact during the welding cycle. There is thus no need for constant adjustment of the bolt connections to be carried out during the warmup period due to the difference in the co-efficient of expansion of the bolt and platen materials. Such constant adjustment of the connections is extremely disadvantageous since each adjustment operation requires the welding chamber to be opened up to provide access to the bolt connections, and consequently loss of heat from the welding chamber and prolongation of the warmup period. The bolt connections according to the present invention are thus a considerably improved kind of connection over, for example, the bolted connections which have been previously proposed.

The temperature of the welding chamber is preferably within the range of 450° C. to 500° C. and thus the platens 27, 29 and 30 are generally formed of a refractory material. Also, the parts of the bolt connections must be capable of withstanding this relatively high temperature and thus the bolts 42 and the bodies 44 may be made of a heat resistant spring steel such as that sold under the trade name "Nimonic 90."

The invention is not restricted to the specific details of the embodiment or the modification described above. For example, the upper platen and the chuck platen may be connected together by more than two bolt connections.

Also, in either the embodiment or the modification, the cap 55 may be of hexagonal cross-section for rotation by a spanner, the tommy-bar holes 52 being omitted. Similarly, the plug 54 in each countersunk portion 50 in the undersurface of the upper platen 29 may be omitted. In this case, each bolt 42 is coated with a refractory material, e.g. alumina material containing chromic oxide, to prevent electric tracking of the bolts 42 during the welding process.

I claim:

1. Vacuum holding apparatus for engaging the upper surface of a sheet of glass in order to hold and lift the sheet in the course of manufacture of an all glass welded double glazing unit, which apparatus comprises a chuck platen, means for lifting the chuck platen and secured to the chuck platen, an interchangeable sheet-holding platen having upper and lower faces, the upper face engaging the chuck platen and the lower face comprising a sheet engaging surface with a recessed area for connection to a source of vacuum, a vacuum supply passage connected to said recessed area, and mechanical connecting means constituting the sole means holding the two platens tightly together in face to face relationship, said mechanical connecting means comprising at least two bolt connections, each bolt screw threadedly engaging a body slidably inserted into an aperture in the chuck platen, the body having a neck portion supporting an upper cap portion above the upper surface of the chuck platen, and a spring disposed between the cap portion of said body and the chuck platen which spring causes the sheet-holding platen to be resiliently urged towards the chuck platen.

2. Apparatus according to claim 1, wherein the spring is a leaf spring having a longitudinal slot for reception of the neck portion of the body, the width of the slot being slightly greater than the diameter of the neck, and the slot being open at one end to permit removal of the spring laterally from said neck.

3. Apparatus according to claim 2, wherein the leaf spring has bent down ends for engagement with an annular protective plate surrounding said aperture in the chuck platen, the central portion of the leaf spring engaging the underside of the cap portion of said body.

4. Apparatus according to claim 2, wherein each end of the spring is swan-necked.

5. Apparatus according to claim 2, wherein the end of the spring which is remote from said longitudinal slot is turned over to form a sleeve for reception of a bar for assisting longitudinal movement, for insertion or removal, of the spring.

6. Vacuum holding apparatus for engaging the upper surface of a sheet of glass in order to hold and lift the sheet in the course of manufacture of an all glass welded double glazing unit, which apparatus comprises a chuck platen, means for lifting the chuck platen and secured to the chuck platen, an interchangeable sheet-holding platen having upper and lower faces, the upper face engaging the chuck platen and the lower face comprising a sheet engaging surface with a recesssed area for connection to a source of vacuum, a vacuum supply passage connected to said recessed area, and mechanical connecting means constituting the sole means holding the two platens tightly together in face to face relationship, said mechanical connecting means comprising at least two bolt connections, each bolt connection comprising a body attached by a first bolt to the sheet-holding platen and slidably inserted into an aperture in the chuck platen, a second heated bolt upstanding from said body, the head of the second bolt being above the upper surface of the chuck platen, and a spring disposed between the head of said second bolt and the chuck platen which spring causes the sheet-holding platen to be resiliently urged towards the chuck platen.

7. Apparatus according to claim 6, wherein the head of said second bolt is capable of passing through said aperture in the chuck platen.

8. Apparatus according to claim 7, wherein the spring is a leaf spring having a longitudinal slot for reception of the shank of the bolt upstanding from said body, the width of the slot being slightly greater than the diameter of the shank and the slot being open at one end to permit removal of the spring longitudinally from said shank.

9. Apparatus according to claim 8, wherein the leaf spring has bent down ends for engagement with an annular protective plate surrounding said aperture in the chuck platen, the central portion of the leaf spring engaging the underside of the head portion of the bolt upstanding from said body.

10. Apparatus according to claim 1, wherein said body is bolted to the sheet holding platen by a bolt having a head which lies within a recess in the lower surface of the sheet holding platen, the bolt being held against rotation relatively to the sheet holding platen.

References Cited
UNITED STATES PATENTS

| | | | |
|---|---|---|---|
| 3,166,202 | 1/1965 | Arnold | 294—65 X |
| 3,272,611 | 9/1966 | Jorgensen | 294—65 X |
| 2,686,687 | 8/1954 | Singleton | 85—8.8 UX |
| 2,210,048 | 8/1940 | Swanson | 85—1 |
| 3,467,430 | 9/1969 | Lowe | 294—65 |
| 483,466 | 9/1892 | Moore | 85—8.8 |

THERON E. CONDON, Primary Examiner

N. ABRAMS, Assistant Examiner

U.S. Cl. X.R.

65—152; 85—4, 8.8; 294—65

UNITED STATES PATENT OFFICE
CERTIFICATE OF CORRECTION

Patent No. 3,690,856    Dated September 12, 1972

Inventor(s) John BRYAN

It is certified that error appears in the above-identified patent and that said Letters Patent are hereby corrected as shown below:

IN THE CLAIMS:

Col. 6, Line 32, after "second", delete "heated", insert --headed--.

Signed and sealed this 19th day of February 1974.

(SEAL)
Attest:

EDWARD M. FLETCHER, JR.
Attesting Officer

C. MARSHALL DANN
Commissioner of Patents